United States Patent [19]

Lutz

[11] 3,735,723

[45] May 29, 1973

[54] INFLATABLE EMERGENCY DEVICE

[76] Inventor: Pierre Lutz, P.O. Box 84, Redding, Conn. 06875

[22] Filed: Sept. 18, 1972

[21] Appl. No.: 289,790

[52] U.S. Cl............................116/124 B, 9/9, 222/5
[51] Int. Cl.................................................G09f 9/00
[58] Field of Search ...........116/124, 124 B, DIG. 44; 9/9, 8, 8.3, 316, 318; 137/223; 222/5, 80

[56] References Cited

UNITED STATES PATENTS

| 2,842,090 | 7/1958 | Samwald | 116/124 B |
|---|---|---|---|
| 3,007,483 | 11/1961 | Keefe | 137/223 |
| 3,142,063 | 7/1964 | Goetzmann, Jr. | 116/124 B |
| 3,154,050 | 10/1964 | Hanson | 116/124 B |
| 3,171,128 | 2/1965 | Shattuck | 9/9 |
| 3,381,655 | 5/1968 | Rozzelle | 116/124 B |
| 3,547,073 | 12/1970 | Colandrea | 116/124 B |
| 3,592,157 | 7/1971 | Schwartz | 116/124 B |

FOREIGN PATENTS OR APPLICATIONS

| 1,344,133 | 10/1963 | France | 116/124 B |

Primary Examiner—Louis J. Capozi
Attorney—William J. Ungvarsky and Francis C. Hand

[57] ABSTRACT

The helium cartridge is mounted within a recess of the casing while the spool of line is mounted within an annular recess about the cartridge chamber. The balloon is disposed within a removable cap mounted on the casing. A needle valve passes through a self-sealing nipple into the balloon as well as into the cartridge chamber. A threaded screw forces the cartridge against the end of the needle valve to rupture the sealing disc therein and permit helium to enter into the balloon after the cap has bwen removed. The balloon is anchored by a line extending from the casing.

10 Claims, 5 Drawing Figures

PATENTED MAY 29 1973 3,735,723

INFLATABLE EMERGENCY DEVICE

This invention relates to an inflatable emergency device. More particularly, this invention relates to an inflatable balloon emergency device.

Various inflatable devices have been known for use in emergency conditions. For example, it has been known to provide kits having balloons which can be inflated and lofted to relatively great heights for purposes of displaying a distress signal should one become lost or incapacitated at sea, in a wooded terrain or elsewhere. However, in many cases, the devices have been of relatively cumbersome construction and, in some cases, have required a great deal of manipulation in order to be placed in operation. In order to overcome such deficiencies, attempts have been made to provide devices which are of relatively simple construction and of compact design. However, the devices which have been produced along these lines have resulted in constructions in which it has been possible to have leakage of the inflating gas into the balloon member when not in use. Such a leakage has either resulted in the device becoming operative when not required or, where sufficient gas has escaped, in rendering the device incapable of use when required. Further, in many instances the inflatable devices have required considerable time and effort not only to assemble the component parts into a saleable package but also to re-package the various parts for a re-use.

Accordingly, it is an object of this invention to provide an emergency balloon device which is of simple compact construction.

It is another object of this invention to provide an emergency balloon device which can be manipulated in a relatively easy manner.

It is another object of this invention to provide an inflatable balloon device which prevents the leakage of inflating air prior to use.

It is another object of the invention to provide an inflatable device of relatively simple parts which can be readily packaged into a compact unit for sale or re-use.

Briefly, the invention provides an inflatable emergency device which is of minimal shape and contour and which can be easily manipulated. The device includes a casing which houses an inflatable gas-containing cartridge having a sealing disc therein and a spool of line, a cap which is releaseably mounted on the casing and houses an inflatable balloon, and means for communicating the interior of the balloon with the cartridge. This latter means includes a needle valve which passes through a self-sealing nipple in the orifice of the balloon at one end and which passes through the casing into adjacent relation to the gas-containing cartridge at the other end. In addition, a means, such as a threaded screw, is provided in the casing to force the cartridge against the end of the needle valve so that the sealing disc can be ruptured by the needle valve to permit a flow of gas to pass from the cartridge through the needle valve into the balloon.

The device further includes a safety lock which is mounted about the threaded screw to prevent accidental movement of the cartridge against the needle valve. This safety lock is readily removable when the device is placed in use.

In use, the cap is initially removed from the cartridge. Thereafter, the safety lock is removed and the threaded screw is rotated into the casing proper so as to move the cartridge against the end of the needle valve with the end of the needle valve piercing the sealing disc of the cartridge. This permits a flow of gas, such as helium, to pass through the needle valve into the balloon for inflation. Once the balloon is inflated, the self sealing nipple is pulled off the needle valve and the line is played out so that the balloon can rise.

It is noted that the nipple for the balloon is in the nature of a valve such as in a basketball valve so as to self seal once the needle valve has been removed therefrom. Further, the needle valve is secured in the casing within a seal disc to such a degree as to remain fixed in place against the force of the cartridge when moved against the needle and against the force created upon removal of the balloon nipple.

The casing is of a cylindrical shape and is of a length about four inches so as to be easily held in one hand. This leaves a person's other hand free to manipulate the threaded screw so as to cause inflation of the balloon. In addition, the annular recess is of sufficient size so as to permit storage of a sufficient length of line. For example, a 150 foot length of monofilament fishing line can be mounted on a cardboard core and stored within the recess.

The balloon which can be of any suitable color, for example, a bright yellow dye containing Rhodamine or Fluorescene (Glo) is folded over the needle valve and is protected by the cap which can be of clear plastic.

These and other objects and advantages of the invention will become more apparent from the following detailed description and appended claims taken in conjunction with the accompanying drawings in which:

FIG. 4 illustrates a condition of the device during inflation of the balloon.

Figure 1:
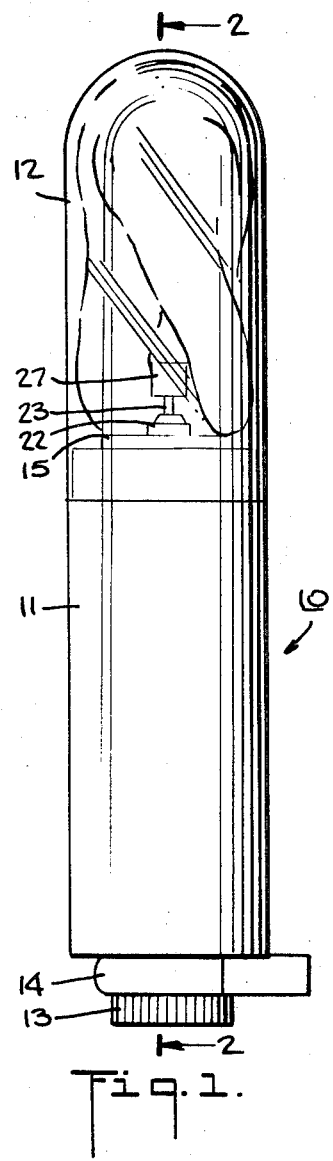
FIG. 1 illustrates a perspective view of the device according to the invention.

Referring to FIG. 1, the emergency device 10 includes a casing 11, for example, of plastic material, a cap 12, for example, of clear plastic material, releaseably secured to the top of the casing 11, a threaded screw 13 threadably mounted in the base of the casing 11 and a removable plastic safety lock 14.

Figure 2:
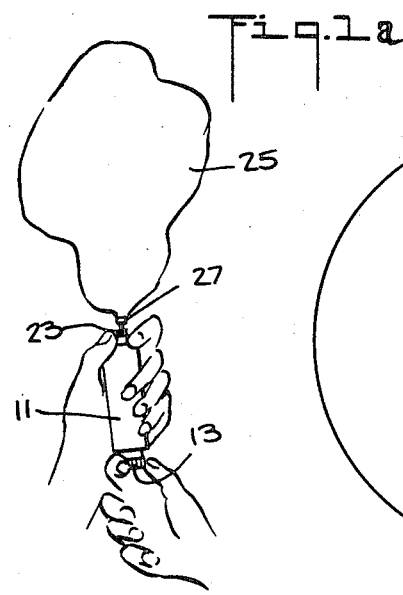
FIG. 2 illustrates a cross-sectional view of the device according to the invention.
Figure 3:
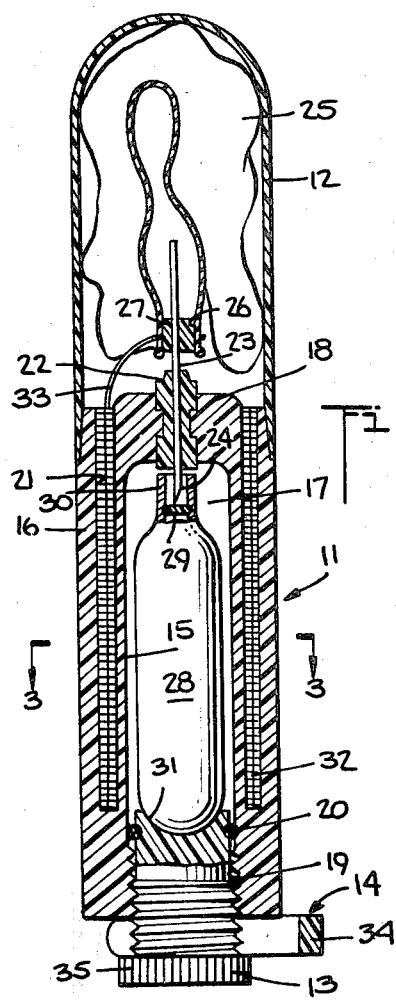
FIG. 3 illustrates a view taken on line 3—3 of FIG. 2.

Referring to FIG. 2, the casing 11 includes a pair of concentric cylinders 15, 16. The inner cylinder 15 has a cylindrical peripheral wall which defines a chamber 17 and includes a transverse wall 18 at one end to close off the chamber 17. In addition, the inner cylinder 15 has a threaded portion 19 which receives the threaded screw 13. An O-ring seal 20 is disposed between the threaded screw 13 and the peripheral wall of the chamber 17 so as to seal the chamber 17 against the passage of gas. The outer cylinder 16 is secured at one end to the inner cylinder 15 to be integral therewith and is spaced from the inner cylinder so as to define an annular recess 21 therebetween.

Figure 1A:
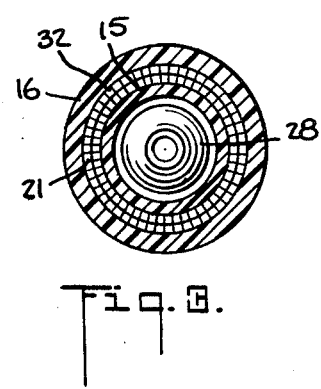

The transverse wall 18 of the inner cylinder 15 has an opening in which a self-sealing valve seat 22, for example, of resilient rubber material, is mounted to seal off the chamber 17. As shown, the valve seat 22 is suitably contoured to be fixedly mounted within the wall 18. In addition, a needle valve 23 of hollow construction and, e.g., of metal material, FIG. 1a illustrates the manner of inflating the ballon; passes through the valve seat 22 and has a sharp end 24 disposed within the chamber 17 of the inner cylinder 15.

An inflatable balloon 25 is disposed within the cap 12 and is folded over the needle valve 23 in a collapsed condition. The balloon 25 has an orifice 26 in which a self-sealing nipple 27 is sealingly secured in any known manner. In addition, the needle valve 23 passes through the nipple 27 so as to communicate with the interior of the balloon 25.

A cartridge 28 containing an inflating gas, for example, helium gas, is mounted within the chamber 17. This cartridge 28 has a rupturable sealing disc 29 disposed at one end thereof, for example, in recessed relationship within a neck 30. The neck 30 of the cartridge 28 is disposed about the sharp end 24 of the needle valve 23 with the disc 29 in spaced relation thereto. In addition, the threaded screw 13 is provided with a suitable recess or depression 31 so as to seat the end of the cartridge 28 thereon.

A spool of line consisting of a cardboard or plastic core 32 and a monofilament line 33, such as a fishing line, is disposed within the annular recess 21 between the cylinders 15, 16 of the casing 11. The core 32 is secured within the recess 21 by a friction fit on the inner cylinder 15. In this way, the spool of line can be easily inserted in the casing 11 when being assembled during manufacture. This also allows the core 32 to be removed for rewinding of a length of line 33 which has been previously run out during a use and to, thereafter, be re-inserted for a second subsequent use. Alternatively, where the device 10 is not to be re-used, the core 32 can be permanently secured in place in any suitable manner, for example, by passing over a circumferential bead on the inner cylinder 15 near the end of the recess 21. One end of the line 33 is secured, for example, by a snap swivel as is known to the balloon 25 while the opposite end is secured to the core 32 or within the casing 11 in any suitable manner. The spool is disposed so as to permit unwinding of the line 33 when the balloon 25 is allowed to rise.

The safety lock 14 is positioned about the threaded screw 13 to prevent threading of the screw 13 into the casing 11 and includes a tab 34 by which the lock 14 can be readily removed under manual force from the threaded screw 13.

In order to facilitate turning of the screw 13, the peripheral surface 35 can be provided with a suitable knurl.

Figure 5:
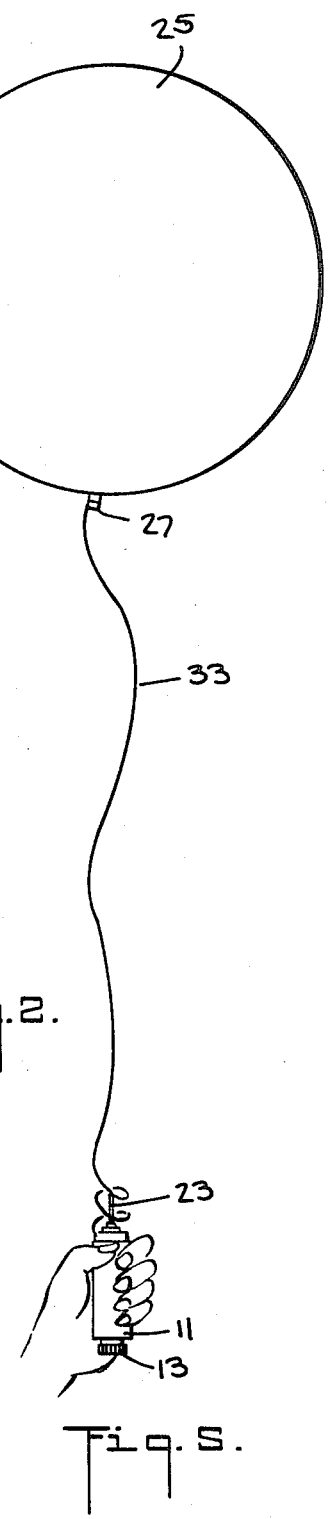
FIG. 5 illustrates the balloon in inflated condition at a point above the casing.

In use, the protective cap 12 is first removed. Next, by holding the casing 11 in the left hand with the thumb and index finger above the outer cylinder 16 (FIG. 4), the balloon 25 is shaken loose so as to reveal the nipple 27 which is then held by the thumb and index finger. The safety lock 14 is then removed and the knurled screw 13 is rotated, for example, clockwise, to push the cartridge 28 towards the needle valve 23. Inflation then starts when the rupturable sealing disc 29 of the cartridge 28 is perforated by the needle valve end 24. After full inflation, the device 10 is held upward and the nipple 27 of the balloon 25 is eased off the needle valve 23. The inflated balloon 25 will then rise upwardly (cf. FIG. 5) until the line 33 is completely reeled off the core 32.

The invention thus provides an emergency balloon device which can be easily manufactured from relatively inexpensive materials. Further, as the various components are of simple construction, the device can be easily and quickly assembled in an efficient manner for either initial assembly or re-use. Also, the construction of the components, especially the spool of line, and the relationship between the various components allows the device to be self-contained within a single unit without need for any connection with other devices. In addition, because of the compact nature of the device, such can be stored in a minimum of space along with other paraphernalia by one who would require such a device.

Further, because the gas containing cartridge must be moved under a positively applied force against the needle valve before gas can flow into the balloon, there is little danger of a gas leak occurring. Thus, the device will be reliable in operation. Also, as the cartridge can be easily replaced after exhaustion of the gas therein, the expense of maintaining the device for repeated uses can be minimized.

Still further, as the various components of the device can be made of relatively inexpensive materials, the device can be constructed for discarding after a single use.

What is claimed is:

1. An inflatable emergency device comprising
a casing including a pair of concentric cylinders, the inner of said cylinders having a transverse wall at one end and a peripheral wall defining a chamber therein, the outer of said cylinders being secured to an opposite end of said inner cylinder and spaced from said peripheral wall of said inner cylinder to define an annular recess therebetween;
an inflatable gas containing cartridge mounted in said chamber, said cartridge having a rupturable means therein for permitting an escape of gas from said cartridge;
means adjustably mounted in said inner cylinder in sealed relation thereto for abutting said cartridge;
a cap releaseably mounted on said outer cylinder;
an inflatable balloon disposed within said cap, said balloon having an orifice therein;
a self-sealing nipple sealingly secured in said orifice of said balloon;
a hollow needle valve extending through said nipple into the interior of said balloon and through said transverse wall of said inner cylinder into adjacent relation to said rupturable means of said cartridge; and
a spool of line disposed within said annular recess of said casing, said line being secured to said balloon at one end and anchored in said casing at the opposite end.

2. An inflatable emergency device as set forth in claim 1 further comprising removal means for limiting movement of said means into said inner cylinder.

3. An inflatable emergency device as set forth in claim 1 which further includes a resilient valve seat sealingly surrounding said needle valve and sealingly disposed in said transverse wall of said inner cylinder.

4. An inflatable emergency device as set forth in claim 1 wherein said spool of line includes a cardboard core mounted in said recess and a line of monofilament material wound on said core.

5. An inflatable emergency device as set forth in claim 1 wherein said spool of line is secured within said recess on said inner cylinder.

6. An inflatable emergency device as set forth in claim 5 wherein said spool of line has a core frictionally mounted on said inner cylinder.

7. An inflatable emergency device comprising
a casing defining a chamber therein;
a gas containing cartridge in said chamber having a rupturable means for permitting an escape of gas therefrom;
means adjustably secured in said casing to move said cartridge longitudinally towards one end thereof;
a cap releaseably secured over said casing;
an inflatable balloon disposed within said cap and including an orifice therein;
a self-sealing nipple sealingly secured in said orifice of said balloon; and
a hollow needle valve fixedly mounted in said casing having one end communicating with the interior of said balloon through said nipple and an opposite end adjacent said rupturable means of said cartridge to transfer gas from said cartridge into said balloon upon rupturing of said rupturable means.

8. An inflatable emergency device as set forth in claim 7 wherein said casing includes an annular recess concentrically of said chamber and which further includes a spool of line mounted in said recess, one end of said line being secured to said balloon and an opposite end of said line being secured to said casing.

9. An inflatable emergency device as set forth in claim 7 wherein said means adjustably secured in said casing is a threaded screw sealingly mounted in said casing.

10. An inflatable emergency device as set forth in claim 7 further including removable means for limiting movement of said means in said casing towards said one end.

* * * * *